US 6,629,237 B2

(12) United States Patent
Wolrich et al.

(10) Patent No.: US 6,629,237 B2
(45) Date of Patent: Sep. 30, 2003

(54) SOLVING PARALLEL PROBLEMS EMPLOYING HARDWARE MULTI-THREADING IN A PARALLEL PROCESSING ENVIRONMENT

(75) Inventors: Gilbert Wolrich, Framingham, MA (US); William R. Wheeler, Southborough, MA (US); Matthew J. Adiletta, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 09/759,380

(22) Filed: Jan. 12, 2001

(65) Prior Publication Data

US 2002/0053016 A1 May 2, 2002

Related U.S. Application Data

(63) Continuation of application No. PCT/US00/24095, filed on Sep. 1, 2000.

(51) Int. Cl.[7] .................................................. G06F 9/38

(52) U.S. Cl. .............................. 712/228; 712/1; 712/34; 712/246

(58) Field of Search .............................. 712/1, 34, 228, 712/246

(56) References Cited

U.S. PATENT DOCUMENTS 5,933,627 A * 8/1999 Parady ........................ 712/228
6,351,808 B1 * 2/2002 Joy et al. .................... 712/228

OTHER PUBLICATIONS

Agarwal et al., "April: A Processor Architecture for Multi-processing", Proceedings of the 17th Annual International Symposium on Computer Architecture, IEEE, pp. 104–114, 1990.*

* cited by examiner

Primary Examiner—William M. Treat
(74) Attorney, Agent, or Firm—Fish & Richardson P.C.

(57) ABSTRACT

A computer instruction includes a command instruction to issue a memory reference to an address in a memory shared among threads executing in microprocessors while a context of a thread is inactive.

23 Claims, 11 Drawing Sheets

PHYSICAL ADDRESS REGISTER NAME

| 31 | 30 29 28 27 | 26 25 24 23 22 21 20 | 19 | 18 17 16 | 15 14 13 12 11 | 10 9 8 7 6 5 4 3 | 2 1 0 |
|----|----|----|----|----|----|----|----|
| ov | uEng ADDR | ABS ov XADD | ov | REF CNT | ov RES | BYTE MASK | ov CTX |

FIG. 6

| PHYSICAL ADDRESS | | | | | REGISTER NAME | | | |
|---|---|---|---|---|---|---|---|---|
| 31 30 29 28 27 | 26 25 24 23 22 21 | 20 19 | 18 17 | 16 15 14 13 12 11 10 9 8 7 6 5 4 3 | 2 | 1 0 |
| ov | uEng ADDR | ABS | XADD | ov | RES | LIST REG | RES | ov | CTX |

FIG. 7

| PHYSICAL ADDRESS | | | | | | | | REGISTER NAME | | | | | |
|---|---|---|---|---|---|---|---|---|---|---|---|---|---|
| 31 30 29 | 28 | 27 26 25 24 23 22 21 | 20 | 19 18 17 | 16 | 15 14 13 12 11 10 9 8 7 6 5 4 3 | 2 | 1 0 |
| uEng ADDR ov | ABS ov | XADD | ov | RES | TS | ST | RES | ov | CTX |

| Bit | 31 | 30 | 29 28 27 26 25 24 23 | 22 21 | 20 | 19 18 17 | 16 | 15 14 13 12 11 10 9 8 7 | 6 5 4 3 | 2 | 1 0 |
|---|---|---|---|---|---|---|---|---|---|---|---|
| PHYSICAL ADDRESS | ov | uEng ADDR | XADD | ABS ov | ov | REFCNT | ov | BYTE MASK | RES | ov | CTX |

REGISTER NAME

FIG. 10

| Bit | 31 | 30 29 28 27 26 25 24 23 | 22 21 | 20 | 19 18 17 | 16 | 15 14 | 13 12 11 10 9 8 7 6 5 4 | 3 | 2 | 1 0 |
|---|---|---|---|---|---|---|---|---|---|---|---|
| PHYSICAL ADDRESS | ov uEng ADDR | RES | ov | ov | REFCNT | RES | BYTE ALN | XMITFIFOQWDADDR | RES | ov | CTX |

REGISTER NAME

FIG. 11

| Bit | 31 | 30 29 28 27 26 25 24 23 | 22 21 | 20 | 19 18 17 | 16 15 14 | 13 12 11 10 9 8 7 6 5 4 | 3 | 2 | 1 0 |
|---|---|---|---|---|---|---|---|---|---|---|
| PHYSICAL ADDRESS | ov uEng ADDR | RES | ov | ov | REFCNT | RES | RECVFIFOQWDADDR | RES | ov | CTX |

REGISTER NAME

FIG. 12

| PHYSICAL ADDRESS | | | | | REGISTER NAME | | | | |
|---|---|---|---|---|---|---|---|---|---|
| 31 30 29 28 27 | 26 25 24 23 22 21 20 | 19 18 17 | 16 15 14 13 12 11 10 | 9 8 7 6 5 4 3 | 2 | 1 0 |
| ov uEng ADDR | ABS ov XADD | ov RE CNT | ov RES | BYTE MASK | ov | CTX |

FIG. 13

| PHYSICAL ADDRESS | | | | REGISTER NAME | |
|---|---|---|---|---|---|
| 31 30 29 28 27 | 26 25 24 23 22 21 20 | 19 18 17 | 16 15 14 13 12 11 10 9 8 7 6 5 4 3 | 2 | 1 0 |
| ov uEng ADDR | ABS ov XADD | ov RES TS ST | RES | ov | CTX |

# SOLVING PARALLEL PROBLEMS EMPLOYING HARDWARE MULTI-THREADING IN A PARALLEL PROCESSING ENVIRONMENT

PRIORITY CLAIM UNDER 35 U.S.C. §120

This application is a continuation application of and claims priority to PCT Application Serial No. PCT/US00/24095, filed on Sep. 1, 2000.

BACKGROUND

This invention relates to memory reference instructions for computer processors.

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, a number of stations are provided with each capable of performing all tasks. That is, in general all or a number of the stations work simultaneously and independently on the same or common elements of a problem. Certain problems are suitable for solution by applying parallel processing.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further in detail by the accompanying drawings, in which:

FIG. 6 is a block diagram of a SRAM/WRITE command.

FIG. 7 is a block diagram of a PUSH/POP Command.

FIG. 8 is a block diagram of an Indirect_ref Format for the BIT_WR Command.

FIG. 9 is a block diagram of a format for an indirect_ref for a READ/WRITE Command.

FIG. 10 is a block diagram of an indirect_ref Format for the T_FIFO_WR command.

FIG. 11 is a block diagram of an indirect_ref Format for the R_FIFO_RD command.

FIG. 12 is a block diagram of a format for an indirect_ref Format for a READ/WRITE Command.

FIG. 13 is a block diagram of an indirect_ref Format for the BIT_WR command.

Like reference symbols in the various drawings indicate like elements.

DETAILED DESCRIPTION

Figure 1:
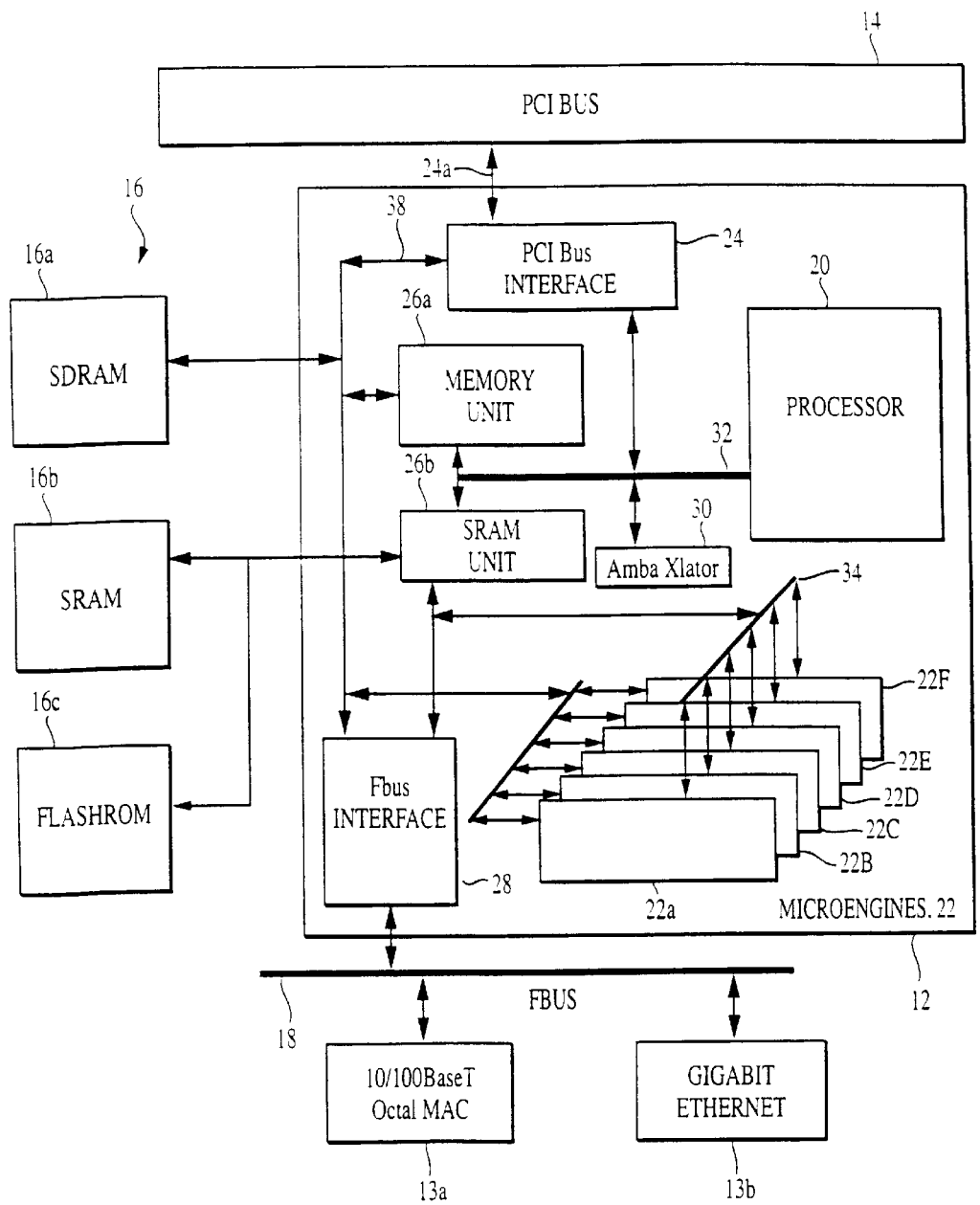
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16 and a second bus 18. The system 10 is especially useful for tasks that can be broken into parallel subtasks or functions. Specifically, hardware-based multithreaded processor 12 is useful for tasks that are bandwidth oriented rather than latency oriented. The hardware-based multithreaded processor 12 has multiple micro engines 22 each with multiple hardware controlled threads that can be simultaneously active and independently work on a task.

The hardware-based multithreaded processor 12 also includes a central controller 20 that assists in loading micro code control for other resources of the hardware-based multithreaded processor 12 and performs other general purpose computer type functions such as handling protocols, exceptions, extra support for packet processing where the micro engines 22 pass the packets off for more detailed processing such as in boundary conditions. In one embodiment, the processor 20 is a Strong Arm® (Arm is a trademark of ARM Limited, United Kingdom) based architecture. The general-purpose microprocessor 20 has an operating system. Through the operating system the processor 20 can call functions to operate on micro engines 22a–22f. The processor 20 can use any supported operating system, preferably a real time operating system. For the core processor 20 implemented as Strong Arm architecture, operating systems such as, Microsoft-NT real-time, VXWorks and microCUS, a freeware operating system available over the Internet, can be used.

Functional micro engines (micro engines) 22a–22f each maintain program counters in hardware and states associated with the program counters. Effectively, a corresponding number of sets of threads can be simultaneously active on each of the micro engines 22a–22f while only one is actually operating at any one time.

In an embodiment, there are six micro engines 22a–22f as shown. Each micro engine 22a–22f has capabilities for processing four hardware threads. The six micro engines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six micro engines 22a–22f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16a. The micro engines 22a–22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a micro engine will cause the SRAM controller 26b to initiate an access to the SRAM memory 16b. The SRAM controller 26b controls arbitration for the SRAM bus, accesses the SRAM 16b, fetches the data from the SRAM 16b, and returns data to a requesting micro engine 22a–22f. During an SRAM access, if the micro engine, e.g., micro engine 22a, had only a single thread that could operate, that micro engine would be dormant until data was returned from the SRAM 16b. By employing hardware context swapping within each of the micro engines 22a–22f, the hardware context swapping enables other contexts with unique program counters to execute in that same micro engine. Thus, another thread, e.g., Thread_1 can function while the first thread, i.e., Thread_0, is awaiting the read data to return. During execution, Thread_1 may access the SDRAM memory 16a. While Thread_1 operates on the SDRAM unit 16a, and Thread_0 is operating on the SRAM unit 16b, a new thread, e.g., Thread_2 can now operate in the micro engine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one micro engine 22a and have one more thread available to process more work in the data path.

The hardware context swapping also synchronizes completion of tasks. For example, two threads could hit the same shared resource e.g., SRAM 16b. Each one of these separate functional units, e.g., the FBUS interface 28, the SRAM controller 26a, and the SDRAM controller 26b, when they complete a requested task from one of the micro engine thread contexts reports back a flag signaling completion of an operation. When the micro engine receives the flag, the micro engine can determine which thread to turn on.

An application for the hardware-based multithreaded processor 12 is as a network processor. As a network processor, the hardware-based multithreaded processor 12 interfaces to network devices such as a media access controller device e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. Communication system 10 functioning in a networking application could receive network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, e.g., Redundant Array of Independent Disk (RAID) storage, a category of disk drives that employs two or more drives in combination for fault tolerance and performance. A further use is as a matching engine. In the securities industry for example, the advent of electronic trading requires the use of electronic matching engines to match orders between buyers and sellers. These and other parallel types of tasks can be accomplished utilizing the system 10.

The processor 12 includes the bus interface 28 that couples the processor to the second bus 18. In an embodiment, bus interface 28 couples the processor 12 to the FBUS (FIFO bus) 18. The FBUS interface 28 is responsible for controlling and interfacing the processor 12 to the FBUS 18. The FBUS 18 is a 64-bit wide FIFO bus, used to interface to Media Access Controller (MAC) devices, e.g., 10/100 Base T Octal MAC 13a.

The processor 12 includes a second interface e.g., PCI bus interface 24, that couples other system components that reside on the PCI 14 bus to the processor 12. The PCI bus interface 24 provides a high-speed data path 24a to memory 16, e.g., SDRAM memory 16a. Through PCI bus interface 24 data can be moved quickly from the SDRAM 16a through the PCI bus 14, via direct memory access (DMA) transfers. The hardware based multithreaded processor 12 supports image transfers. The hardware based multithreaded processor 12 can employ DMA channels so if one target of a DMA transfer is busy, another one of the DMA channels can take over the PCI bus 14 to deliver information to another target to maintain high processor 12 efficiency. Additionally, the PCI bus interface 24 supports target and master operations. Target operations are operations where slave devices on bus 14 access SDRAMs through reads and writes that are serviced as a slave to a target operation. In master operations, the processor core 20 sends data directly to or receives data directly from the PCI interface 24.

Each of the functional units 22 is coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB Advanced System Bus (ASB), that couples the processor core 20 to the memory controller 26a, 26b and to an ASB translator 30, described below. The ASB bus 32 is a subset of the so-called Advanced Microcontroller Bus Architecture (AMBA) bus that is used with the Strong Arm processor core 20. AMBA is an open standard, on-chip bus specification that details a strategy for the interconnection and management of functional blocks that makes up a System-on-chip (SoC). The processor 12 also includes a private bus 34 that couples the micro engine units 22 to SRAM controller 26b, ASB translator 30 and FBUS interface 28. A memory bus 38 couples the memory controller 26a, 26b to the bus interfaces 24 and 28 and memory system 16 including flashrom 16c that is used for boot operations and so forth.

Figures 1, 2:
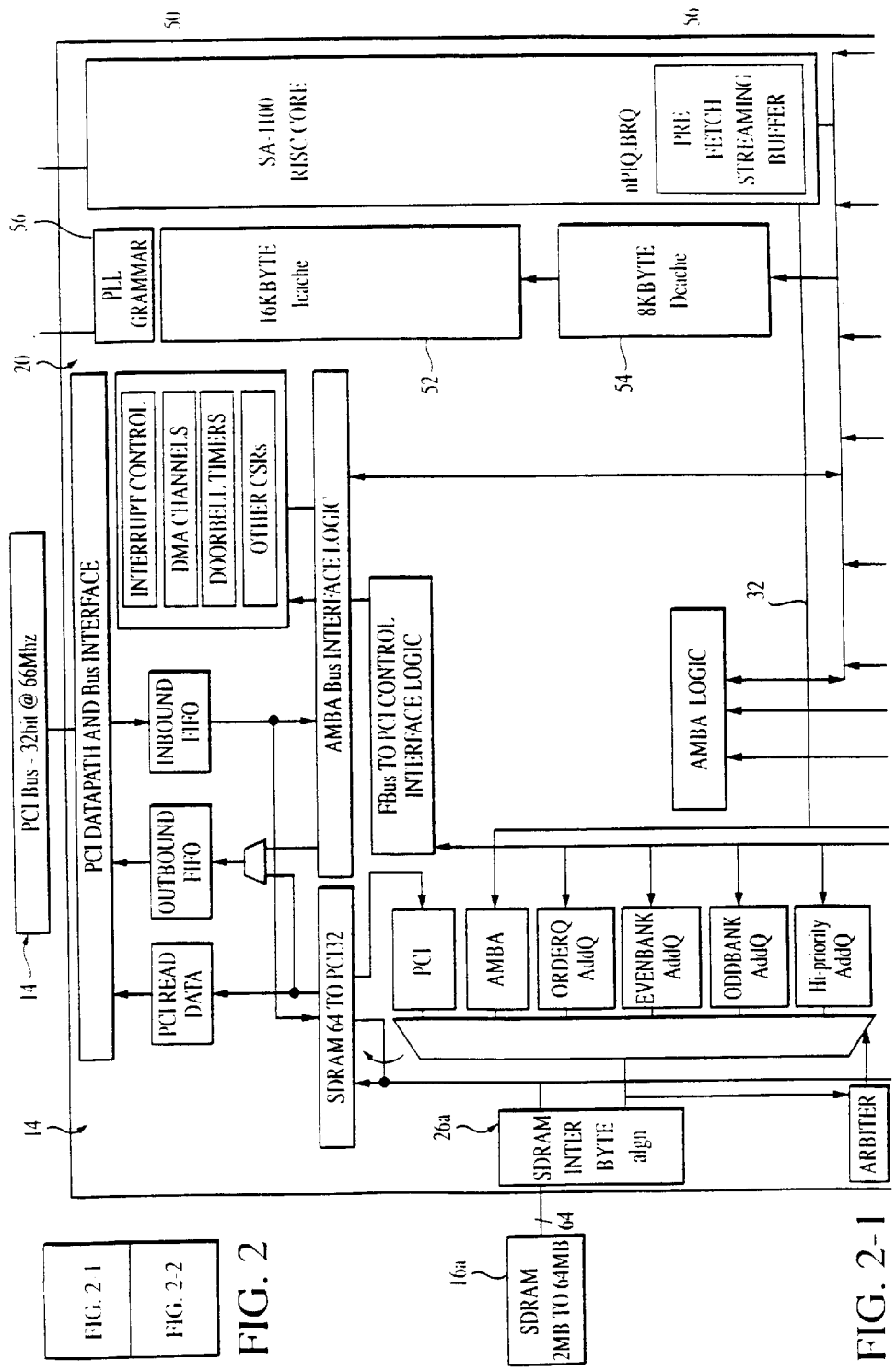
FIG. 2 is a detailed block diagram of the hardware-based multithreaded processor of FIG. 1.
Figure 2:
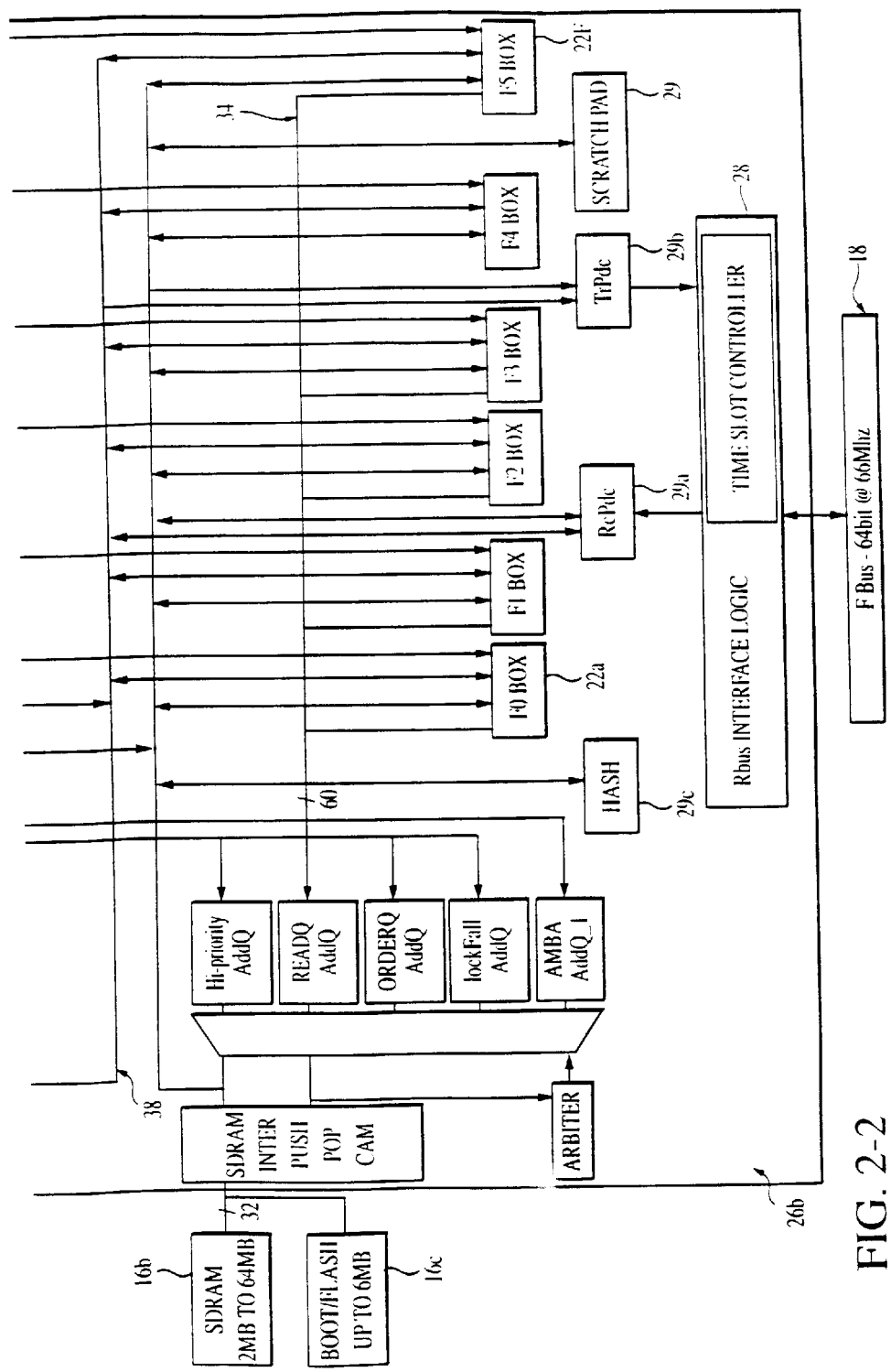

Referring to FIG. 2, each of the micro engines 22a–22f includes an arbiter that examines flags to determine the available threads to be operated upon. Any thread from any of the micro engines 22a–22f can access the SDRAM controller 26a, SDRAM controller 26b or FBUS interface 28. The memory controllers 26a and 26b each include queues to store outstanding memory reference requests. The queues either maintain order of memory references or arrange memory references to optimize memory bandwidth. For example, if a thread_0 has no dependencies or relationship to a thread_1, there is no reason that thread_1 and thread_0 cannot complete their memory references to the SRAM unit 16b out of order. The micro engines 22a–22f issue memory reference requests to the memory controllers 26a and 26b. The micro engines 22a–22f flood the memory subsystems 26a and 26b with enough memory reference operations such that the memory subsystems 26a and 26b become the bottleneck for processor 12 operation.

If the memory subsystem 16 is flooded with memory requests that are independent in nature, the processor 12 can perform memory reference sorting. Memory reference sorting improves achievable memory bandwidth. Memory reference sorting, as described below, reduces dead time or a bubble that occurs with accesses to SRAM 16b. With memory references to SRAM 16b, switching current direction on signal lines between reads and writes produces a bubble or a dead time waiting for current to settle on conductors coupling the SRAM 16b to the SRAM controller 26b.

That is, the drivers that drive current on the bus need to settle out prior to changing states. Thus, repetitive cycles of a read followed by a write can degrade peak bandwidth. Memory reference sorting allows the processor 12 to organize references to memory such that long strings of reads can be followed by long strings of writes. This can be used to minimize dead time in the pipeline to effectively achieve closer to maximum available bandwidth. Reference sorting helps maintain parallel hardware context threads. On the SDRAM 16a, reference sorting allows hiding of pre-charges from one bank to another bank. Specifically, if the memory system 16b is organized into an odd bank and an even bank, while the processor is operating on the odd bank, the memory controller can start pre-charging the even bank. Pre-charging is possible if memory references alternate between odd and even banks. By ordering memory references to alternate accesses to opposite banks, the processor 12 improves SDRAM bandwidth. Additionally, other optimizations can be used. For example, merging optimizations where operations that can be merged, are merged prior to memory access, open page optimizations where by examining addresses an opened page of memory is not reopened, chaining, as will be described below, and refreshing mechanisms, can be employed.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a micro programmable source/destination/protocol hashed lookup (used for address smoothing) in SRAM 16b. If the hash does not successfully resolve, the packet header is sent to the processor core 20 for additional processing. The FBUS interface 28 supports the following internal data transactions:

| FBUS unit | (Shared bus SRAM) | to/from micro engine. |
| FBUS unit | (via private bus) | writes from SDRAM Unit. |
| FBUS unit | (via Mbus) | Reads to SDRAM. |

The FBUS 18 is a standard industry bus and includes a data bus, e.g., 64 bits wide and sideband control for address and read/write control. The FBUS interface 28 provides the ability to input large amounts of data using a series of input and output FIFOs 29a–29b. From the FIFOs 29a–29b, the micro engines 22a–22f fetch data from or command the SDRAM controller 26a to move data from a receive FIFO in which data has come from a device on bus 18, into the FBUS interface 28. The data can be sent through memory controller 26a to SDRAM memory 16a, via a direct memory access. Similarly, the micro engines can move data from the SDRAM 26a to interface 28, out to FBUS 18, via the FBUS interface 28.

Data functions are distributed amongst the micro engines 22. Connectivity to the SRAM 26a, SDRAM 26b and FBUS 28 is via command requests. A command request can be a memory request or a FBUS request. For example, a command request can move data from a register located in a micro engine 22a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the micro engines 22a–22f. This enables micro engines 22a–22f, to have local access to data rather than arbitrating for access on a bus and risk contention for the bus. With this feature, there is a zero cycle stall for waiting for data internal to the micro engines 22a–22f.

The data buses, e.g., ASB bus 30, SRAM bus 34 and SDRAM bus 38 coupling these shared resources, e.g., memory controllers 26a and 26b, are of sufficient bandwidth such that there are no internal bottlenecks. In order to avoid bottlenecks, the processor 12 has a bandwidth requirement where each of the functional units is provided with at least twice the maximum bandwidth of the internal buses. As an example, the SDRAM 16a can run a 64 bit wide bus at 83 MHz. The SRAM data bus could have separate read and write buses, e.g., could be a read bus of 32 bits wide running at 166 MHz and a write bus of 32 bits wide at 166 MHz. That is, in essence, 64 bits running at 166 MHz that is effectively twice the bandwidth of the SDRAM.

The core processor 20 also can access the shared resources. The core processor 20 has a direct communication to the SDRAM controller 26a to the bus interface 24 and to SRAM controller 26b via bus 32. However, to access the micro engines 22a–22f and transfer registers located at any of the micro engines 22a–22f, the core processor 20 access the micro engines 22a–22f via the ASB Translator 30 over bus 34. The ASB translator 30 can physically reside in the FBUS interface 28, but logically is distinct. The ASB Translator 30 performs an address translation between FBUS micro engine transfer register locations and core processor addresses (i.e., ASB bus) so that the core processor 20 can access registers belonging to the micro engines 22a–22f.

Although micro engines 22a–22f can use the register set to exchange data as described below, a scratchpad memory 27 is also provided to permit micro engines 22a–22f to write data out to the memory for other micro engines to read. The scratchpad 27 is coupled to bus 34.

The processor core 20 includes a RISC core 50 implemented in a five stage pipeline performing a single cycle shift of one operand or two operands in a single cycle, provides multiplication support and 32 bit barrel shift support. This RISC core 50 is a standard Strong Arm® architecture but it is implemented with a five-stage pipeline for performance reasons. The processor core 20 also includes a 16-kilobyte instruction cache 52, an 8-kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus 32.

Figure 3:
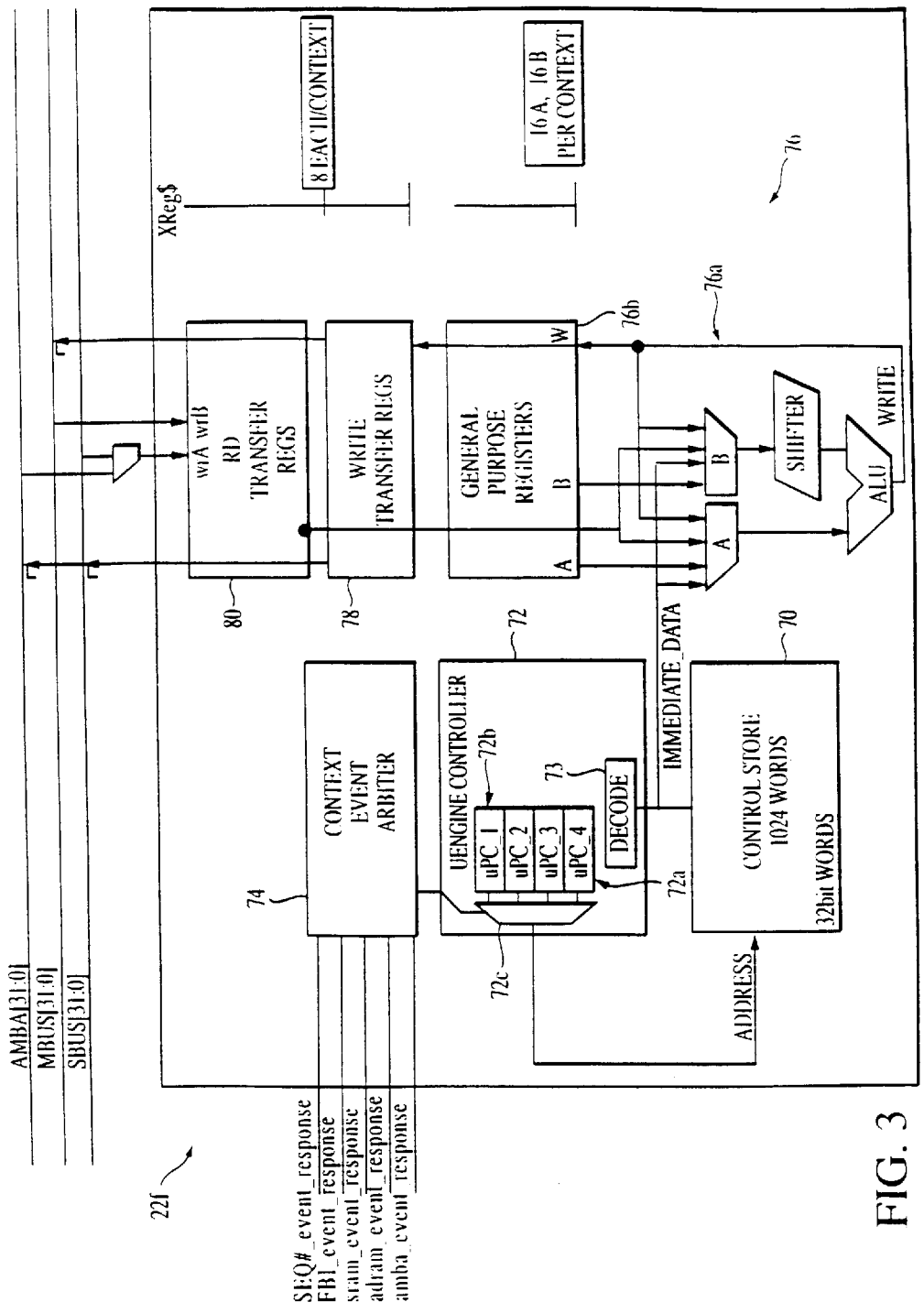
FIG. 3 is a block diagram of a micro engine functional unit employed in the hardware-based multithreaded processor of FIGS. 1 and 2.

Referring to FIG. 3, an exemplary one of the micro engines 22a–22f, e.g., micro engine 22f, is shown. The micro engine 22f includes a control store 70, which, in one implementation, includes a RAM of here 1,024 words of 32 bit. The RAM stores a micro program (not shown). The micro program is loadable by the core processor 20. The micro engine 22f also includes controller logic 72. The controller logic 72 includes an instruction decoder 73 and program counter (PC) units 72a–72d. The four micro program counters 72a–72d are maintained in hardware. The micro engine 22f also includes context event switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The micro engine 22f can have a maximum of four threads available.

In addition to event signals that are local to an executing thread, the micro engines 22a–22f employ signaling states that are global. With signaling states, an executing thread can broadcast a signal state to all micro engines 22a–22f, e.g., Receive Request Available (RRA) signal, any and all threads in the micro engines 22a–22f can branch on these signaling states. These signaling states can be used to determine availability of a resource or whether a resource is due for servicing.

The context event logic 74 has arbitration for the four threads. In an embodiment, the arbitration is a round robin mechanism. Other techniques could be used including priority queuing or weighted fair queuing. The micro engine 22f also includes an execution box (EBOX) data path 76 that includes an arithmetic logic unit (ALU) 76a and general-purpose register set 76b. The ALU 76a performs arithmetic and logical functions as well as shift functions. The register set 76b has a relatively large number of general-purpose registers. In an embodiment, there are 64 general-purpose registers in a first bank, Bank A and 64 in a second bank, Bank B. The general-purpose registers are windowed so that they are relatively and absolutely addressable.

The micro engine 22f also includes a write transfer register stack 78 and a read transfer stack 80. These registers 78 and 80 are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74, which will then alert the thread that the data is available or has been sent. Both transfer register banks 78 and 80 are connected to the execution box (EBOX) 76 through a data path. In an embodiment, the read transfer register has 64 registers and the write transfer register has 64 registers.

Figure 4:
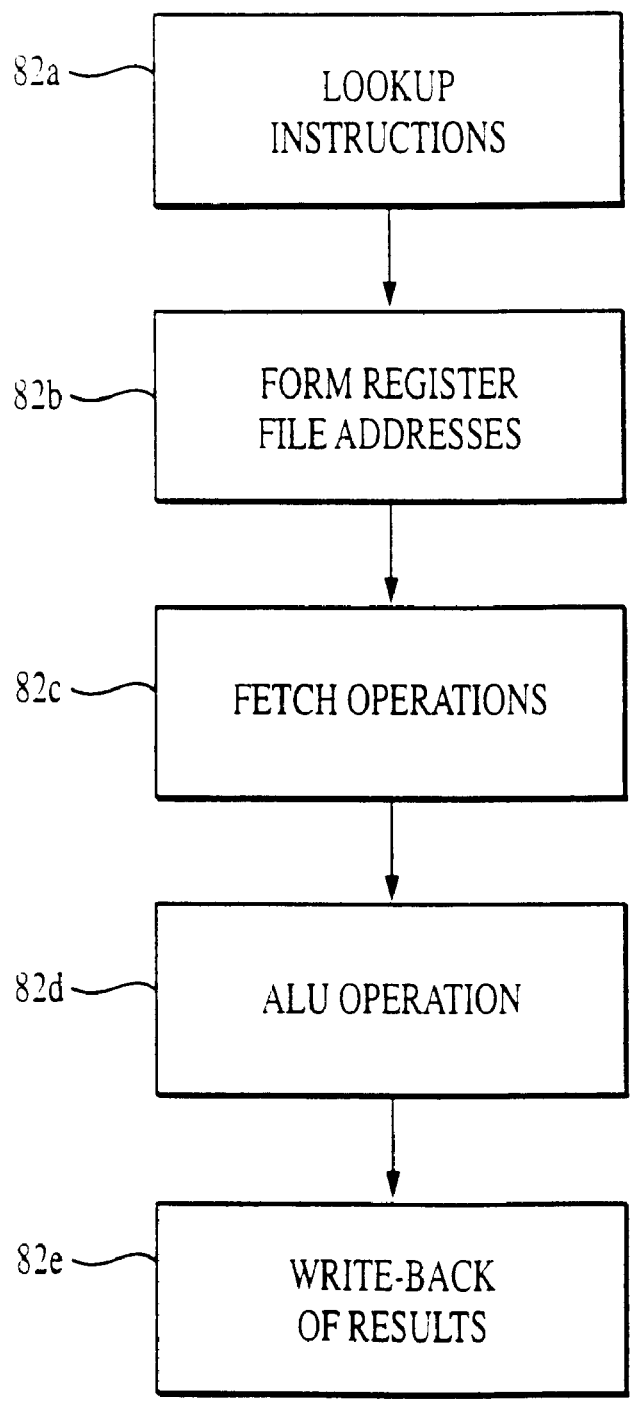
FIG. 4 is a block diagram of a pipeline in the micro engine of FIG. 3.

Referring to FIG. 4, the micro engine data path maintains a 5-stage micro-pipeline 82. This pipeline includes lookup of microinstruction words 82a, formation of the register file addresses 82b, read of operands from register file 82c, ALU shift or compare operations 82d, and write-back of results to registers 82e. By providing a write-back data bypass into the ALU/shifter units, and by assuming the registers are implemented as a register file (rather than a RAM), the micro engine 22f can perform a simultaneous register file read and write, which completely hides the write operation.

The SDRAM interface 26a provides a signal back to the requesting micro engine on reads that indicates whether a parity error occurred on the read request. The micro engine micro code is responsible for checking the SDRAM 16a read Parity flag when the micro engine uses any return data. Upon checking the flag, if it was set, the act of branching on it clears it. The Parity flag is only sent when the SDRAM 16a is enabled for checking, and the SDRAM 16a is parity protected. The micro engines 22 and the PCI Unit 14 are the only requesters notified of parity errors. Therefore, if the processor core 20 or FIFO 18 requires parity protection, a micro engine assists in the request. The micro engines 22a–22f support conditional branches.

The instruction set also includes an instruction that issues a memory reference to Static Random Access Memory (SRAM).

A format of the instruction that issues a memory reference to SRAM is sram[sram_cmd, $sram_xfer_reg, source_op1, source_op2, ref_count_or_queue_num_or_bit_op], optional_token. A description of each of the fields follows.

The "sram_cmd" field refers to an operation to be performed on SRAM. Operations include bit_wr, read, read_lock, write, write_unlock, unlock, push and pop.

The "bit_wr" operation sets or clears user specified bits in an SRAM longword. The "read" operation reads from SRAM to an SRAM transfer register. The "read_lock" operation locks memory and then reads it. If memory is already locked, it waits until it is unlocked. The "ctx_swap" optional token is always required for a read lock operation.

The "write" operation writes to SRAM from an SRAM transfer register. The "write_unlock" operation performs a write and unlocks a specified address. The "unlock" operation unlocks a specified address without performing a read or a write.

The "push" operation pushes a list element specified by an address onto a specified stack. The "pop" operation pops a list element specified by an address from a specified stack.

The "$sram_xfer_reg" field indicates if the read, read_lock, write, or write_unlock sram_cmd parameters are used, the contents of this transfer register is the beginning of a contiguous set of registers that receive or supply the SRAM data on a read or write operation, respectively. SRAM transfer register names always begin with a $ symbol. If the unlock sram_cmd parameter is used, this register is not meaningful and the "—" notation is used instead of a register name. If the pop sram_cmd parameter is used, this register contains the pointer to the list that is removed from the queue specified by ref_count_or_queue_num. This register has no meaning if push is specified as an sram_cmd parameter and the "—" notation is used. If the bit_wr sram_cmd parameter is used, this register contains the bit mask that chooses which bits should be set or cleared. For the test_and_set_bits and test_and_clear_bits options, this register also returns the original data as it existed before setting or clearing bits.

The "source_op1" and "source_op2" fields refer to context-relative registers or 5-bit zero filled immediate data ranging from +31 to 0. These fields are added together to form a longword address to SRAM memory space. For the push sram_cmd parameter, the sum specifies the address that is to be pushed onto the queue. This register has no meaning if pop is specified as an sram_cmd parameter and dummy parameters for source_op1 and source_op2 are used in this case.

The "ref_count_or_queue_num_or_bit_op" field indicates if the read, read_lock, write, or write_unlock sram_cmd parameters are used, it specifies the number of contiguous SRAM longwords to be referenced with this operation. If the count is >1, then the SRAM address is implicitly incremented for each subsequent reference. If a read_lock or write_unlock command is specified with a ref_count>1, the ref_count refers only to the number of memory words transferred and not to the number of addresses locked or unlocked. The number of addresses locked or unlocked per reference is always 1. If the unlock sram_cmd parameter is used, this register is not meaningful and a 1 is always used. If the push or pop sram_cmd parameters are used, this specifies one of the eight push/pop queues. Valid queue numbers are 0 through 7. If the bit_wr sram_cmd parameter is used, one of the following parameters must be used: set_bits, clear_bits, test_and_set_bits, or test_and_clear_bits. set_bits and clear_bits are used to set or clear bits at an address using a specified bit mask. test_and_set_bits and test_and_clear_bits are also used to set or clear bits, but return the original data as it existed before the operation.

The "sig_done" parameter indicates when the reference completes, signal the corresponding microengine/thread pair that is sourcing or sinking the memory data. Not used with ctx_swap.

The "ctx_swap" parameter indicates when the memory reference is issued, swap out the current thread execution to let another one run. Not used with sig_done and always required for the read lock command.

The "defer [1]" parameter is used with the ctx_swap option; it specifies that one instruction will be executed after this reference before the context is swapped and is not used with sig_done.

The "ordered" parameter places this SRAM reference into the Ordered queue. The Ordered queue preserves the order of execution of references that use the ordered optional token. For example, if a thread issues two writes with the sig_done optional token on the second reference, both references would need to be ordered to ensure that the second reference finishes after the first. Not used with optimize_mem or priority. If neither ordered nor optimize_mem is specified, the default value becomes ordered.

The "priority" parameter places this SRAM reference into the Priority queue. The Priority queue gives higher priority to this memory reference over others. Not used with ordered or optimize_mem. If neither priority nor optimize_mem is specified, the default value becomes ordered.

The "optimize_mem" parameter optimizes memory bandwidth by automatically placing the SRAM reference into either the Read or Ordered queues. The Read or Ordered queues are selected according to whether the operation is a read or a write. This may result in the references being executed in an order different from that in which they were issued. Not used with ordered or priority. If neither priority nor optimize_mem is specified, the default value becomes ordered.

The "indirect_ref" parameter indicates that overriding qualifiers or additional qualifiers are associated with this reference. These qualifiers are output by the ALU during the previous microword. The format of the qualifier depends on the SRAM command. There are different formats for read/write, push/pop, and bit_wr, as shown in the following illustrations.

Figure 5:
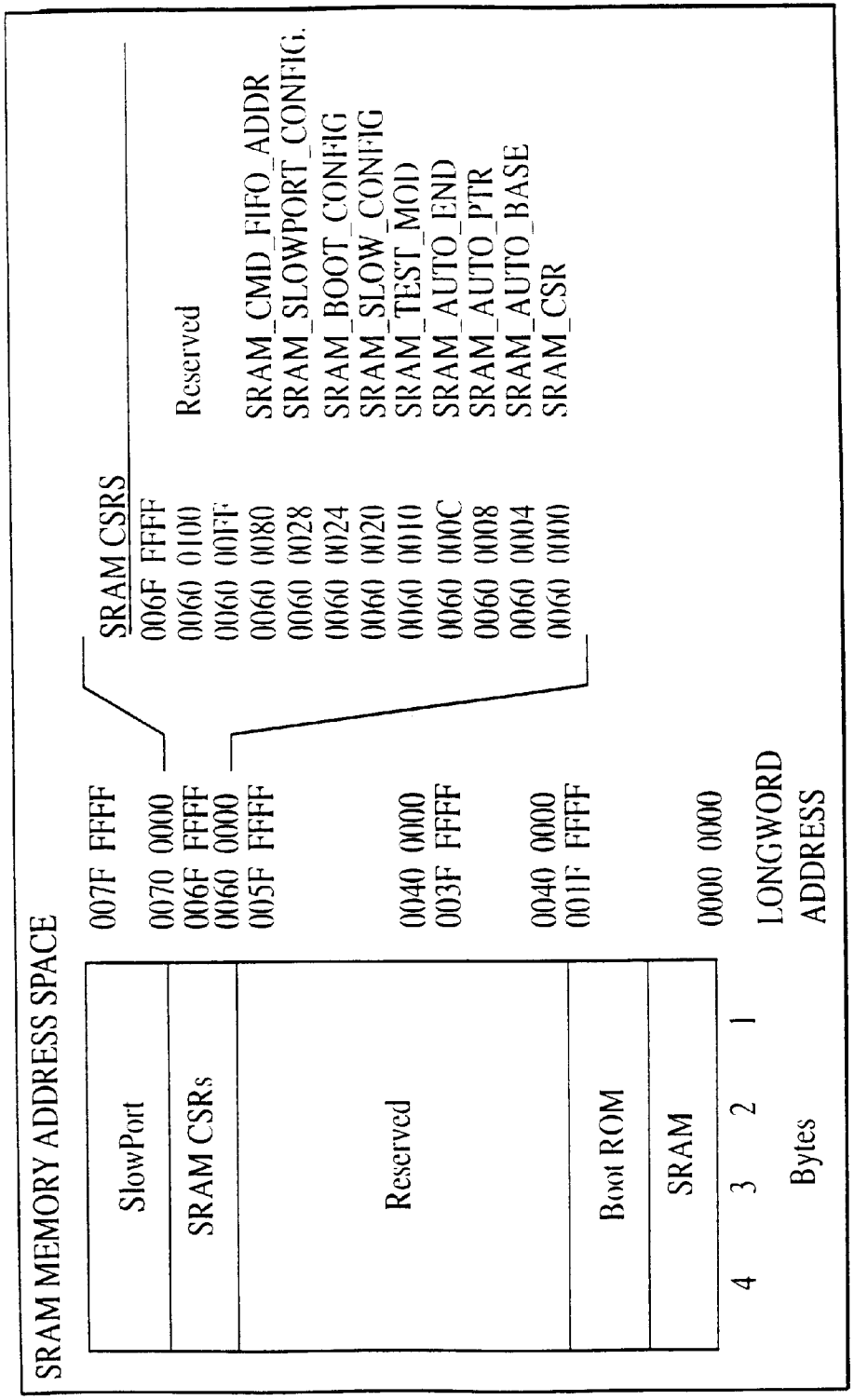
FIG. 5 is a block diagram of SRAM address space.

Referring to FIG. 5, a block diagram of SRAM address space is shown.

Referring to FIG. 6, a block diagram of a SRAM/WRITE command is shown, where:

| Bits | Field | Description |
| --- | --- | --- |
| 31 | OV | If set, the UENG ADDR field overrides the default microengine address implied by the RAM instruction, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27 | OV | If set, the XADD field overrides the default transfer register address implied by the SRAM instruction. |
| 26 | ABS | If set, enables absolute addressing for the microengine transfer registers. This bit should always be set if bit [27] (OV) is set. |
| 25:21 | XADD | Absolute transfer register address. Valid addresses are: 0–7 Eight transfer registers for context 0. 8–15 Eight transfer registers for context 1. 16–23 Eight transfer registers for context 2. 24–31 Eight transfer registers for context 3. |
| 20 | OV | If set, the REF CNT field overrides the ref_count specified by the SRAM instruction |
| 19:16 | REF CNT | The number of longwords to be transferred to/from SRAM. Valid REF CNT values are 0 through 7, where the number of longwords = REF CNT + 1. |
| 15 | OV | If set, the BYTE MASK field overrides default byte mask of 0xFF implied by the SRAM instruction |
| 14:11 | RES | Reserved. Returns 0 when read. |
| 10:7 | BYTE MASK | BYTE MASK allows aligned byte write operations within an addressed SRAM longword. The bytes that are written are specified by the byte mask. For each bit in the byte mask, value of 1 enables a a write occur in corresponding byte position and a value of 0 preserves the previously existing value. The least significant bit corresponds to the right-most byte; the most significant bit corresponds to the left-most byte. A byte mask other than the default (0xF) requires the SRAM controller perform a read-modify-write operation, which impacts performance. |
| 6:3 | RES | Reserved. Returns 0 when read |
| 2: | OV | If set, the CTX field overrides the default context implied by the SRAM instruction. |
| 1:0 | CTX | Specifies the context associated with the memory reference. If bit [2] = 0, this field is a don't care. Valid CTX values are 0 through 3. |

Referring to FIG. 7, a block diagram of a PUSH/POP Command is shown, where:

| Bits | Field | Description |
| --- | --- | --- |
| 31 | OV | If set, the UENG ADDR field overrides the default microengine address implied by the SRAM command, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27 | OV | If set, the XADD field overrides the default transfer register address implied by the SRAM instruction. |
| 26 | ABS | If set, enables absolute addressing for the microengine transfer registers. This bit should always be set if bit [27] (OV) is set. |
| 25:21 | XADD | Absolute transfer register address. Valid addresses are: 0–7 Eight transfer registers for context 0. 8–15 Eight transfer registers for context 1. 16–23 Eight transfer registers |

| Bits | Field | Description |
|---|---|---|
| | | for context 2.<br>24–31 Eight transfer registers for context 3. |
| 20 | OV | If set, the REF CNT field overrides the ref_count specified by the SRAM instruction. |
| 19 | RES | Reserved. Returns 0 when read. |
| 18:16 | LIST REG | Specifies one of the 8 push/pop registers. Valid LIST REG values are 0 through 7. |
| 15:3 | RES | Reserved. Returns 0 when read. |
| 2 | OV | If set, the CTX field overrides the default context implied by the SRAM instruction. |
| 1:0 | CTX | Specifies the context associated with the memory reference. If bit [2] = 0, this field is a don't care. Valid CTX values are 0 through 3. |

Referring to FIG. 8 a block diagram of an Indirect_ref Format for the BIT_WR Command is shown, where:

| Bits | Field | Description |
|---|---|---|
| 31 | OV | If set, the UENG ADDR field overrides the default microengine address implied by the SRAM instruction, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27 | OV | If set, the XADD field overrides the default transfer register address implied by the SRAM instruction. |
| 26 | ABS | If set, enables absolute addressing for the microengine transfer registers. This bit should always be set if bit [27] (OV) is set. |
| 25:21 | XADD | Absolute transfer register address. Valid addresses are:<br>0–7 Eight transfer registers for context 0.<br>8–15 Eight transfer registers for context 1.<br>16–23 Eight transfer registers for context 2.<br>24–31 Eight transfer registers for context 3. |
| 20 | OV | If set, the TS and ST fields override the bit operation specified by the SRAM instruction. |
| 19:18 | RES | Reserved. Returns 0 when read. |
| 17 | TS | When set, specifies that the read data is returned before the write operation so that the data can be tested. |
| 16 | ST | Specifies whether the operation is set (ST = 1) or clear (ST = 0). |
| 15:3 | RES | Reserved. Returns 0 when read. |
| 2 | OV | If set, the CTX field overrides the default context implied by the SRAM instruction. |
| 1:0 | CTX | Specifies the context associated with the memory reference. If bit [2] = 0, this field is a don't care. Valid CTX values are 0 through 3. |

Several examples of the SRAM instruction follow.

In an example, sram [write, $xfer7,tempa,tempb,1], optimize_mem instructs write the context of the SRAM transfer register $xfer7 to the memory location at the address specified by tempa+tempb. Memory is optimized by placing this reference in either the Read or Order queue.

In an example, sram [read,$xfer1,tempa,0×15,4],priority, ctx_swap, defer [1] immed [final_queue,0] reads four longword memory locations at the address specified by temp+0×15 into the contiguous SRAM transfer registers starting at $xfer1. Place the reference in the priority queue and swap out the context after the next instruction (immed) is executed.

In another example, sram [pop,$xfer2,—,—,4], optimize_mem, ctx_swap, defer [1] ld_field [protocol_group,0110,$$xfer0,>>8]. Pop the pointer off of queue number 4 and return it to the SRAM transfer register $xfer2. Optimize memory by placing this reference in either the Read or Ordered queue and swap out the context after the next instruction (ld_field) is executed. The—notation for source_op1 and source_op2 indicates that these operands do not apply to the pop command.

In another example, sram [push,—, head_offset, sram_buff_descriptor_base,4]. Push the pointer whose values are specified by head_offset+sram_buff_descriptor_base onto queue 4. The—notation for $sram_xfer_reg indicates that this transfer register is not relevant to the push command.

In another example, sram [read_lock, $xfer6, queue_descriptor_addr,0,2], optimize_mem, ctx_swap. Lock the SRAM memory at the location specified by queue_descriptor addr+0 and read that memory location plus the next contiguous location into the contiguous SRAM transfer registers beginning with $xfer6. Optimize memory by placing this reference in either the Read or Ordered queue and swap out the context.

In an example, sram [write_unlock, $xfer1, queue_descriptor_addr, 0, 2], ctx_swap,defer [1] alu [tempa,—,b, @sram_counter_base]. Unlock the SRAM memory at the location specified by queue_descriptor_addr+0 and write the two contiguous SRAM transfer registers beginning with $xfer6 into the SRAM memory location plus the next contiguous location. Swap out the context after the next instruction (ALU) is executed. This reference is placed into the default (Ordered) queue.

In another example, sram [unlock, $xfer1, queue_descriptor_addr, 0, 2], ctx_swap, defer [1] ALU [tempa,—, b,@sram_counter_base]. Unlock the SRAM memory at the location specified by queue_descriptor_addr+0. Swap out the context after the next instruction (ALU) is executed.

In an example, sram [bit_wr, $xfer5, tempa, 0, set_bits]. Set the bits specified by the bit mask in the SRAM transfer register $xfer at the SRAM memory address specified by tempa+0.

In another example, sram [bit_wr, $xfer5, tempa, 0, test_and_clear_bits]. Clear the bits specified by the bit mask in the SRAM transfer register $xfer5 at the SRAM memory address specified by tempa+0. Return the entire 32 bit data at that location prior to this change to the SRAM transfer register $xfer5 so that the bits can be tested.

In another example sram [read, $xfer1, tempa, 0, 1],ordered/reference 1 sram [read, $xfer2, tempb, 0, 1], optimize_mem/reference 2 sram [read, $xfer3, tempc, 0, ],ordered/reference 3. Issue three SRAM references and swap out the context once reference 3 is issued. Wake up the context once reference 3 is complete. Reference 1 is guaranteed to be completed when the context wakes since it is ordered with reference 3. Reference 2 is not ordered so it is not guaranteed to have completed.

The computer instruction architecture also includes an instruction to issue a memory reference to Synchronous Dynamic Random Access Memory (SDRAM). A format of the SDRAM instruction is:

sdram[sdram_cmd, $$sdram_xfer_reg, source_op1, source_op2, ref_count], optional_token where each of the fields are described below.

The "sdram_cmd" field represents the operation to be performed on SDRAM, i.e., a "read" commend reads from SDRAM to an SDRAM transfer register. A "write" command writes to SDRAM from an SDRAM transfer register. A "r_fifo_rd" command reads from receive FIFO to SDRAM and always requires an indirect_ref optional token, more fully discussed below. A "t_fifo_wr" command writes to transmit FIFO from SDRAM and also always requires an indirect_ref optional token.

The "$$sdram_xfer_reg" field is a register that is the beginning of a contiguous set of registers which receive or supply the SDRAM data on a read or write operation, respectively. Two contiguous transfer registers are associated with each ref_count, since each ref_count refers to a quadword. SDRAM transfer register names always begin with a $$ symbol.

The "source_op1" and "source_op2" fields are context-relative registers or 5-bit zero filled immediate data ranging from +31 to 0. These operands are added together to form the SDRAM address.

The "ref_count" field represents a number of contiguous SDRAM quadwords to be referenced with this operation. If the ref_count is >1, then the SDRAM address is implicitly incremented for each subsequent reference. Valid ref_count values are 1 through 4. For ref_count values greater than 4, the indirect_ref optional token is used.

The "optional_token" is an optional user selectable field containing one of the following parameters. A "sig_done" parameter indicates when the reference completes, signal the corresponding microengine/thread pair that is sourcing or sinking the memory data. It is not used with ctx_swap or defer [1] parameters.

A "ctx_swap" parameter indicates when the memory reference is issued, swap out the current thread execution to let another one run. Not used with chain_ref and sig_done.

A "chain_ref" parameter indicates that the next SDRAM reference from this micro engine/thread pair will be processed by the SDRAM unit immediately following the current reference. References from other micro engine/thread pairs will not be accepted by the SDRAM unit until the chain is complete. It is not used with ctx_swap or defer parameters. Once a chain is started, branch instructions can not be executed by a microengine/thread pair until the chain is complete.

The "defer [1]" parameter is used with the ctx_swap option and specifies that one instruction will be executed after this reference before the context is swapped. It is not used with chain_ref or sig_done parameters.

The "ordered" parameter places this SDRAM reference into an ordered queue. The ordered queue preserves the order of execution of references that use the ordered optional token. For example, if a thread issues two writes with the sig_done optional token on the second reference, both references would need to be ordered to ensure that the second reference finishes after the first. Not used with optimize_mem or priority. If neither priority nor optimize_mem is specified, the default value becomes ordered.

The "priority" parameter places this SDRAM reference into a priority queue. The priority queue gives higher priority to this memory reference over others. Not used with ordered or optimize_mem. If neither priority nor optimize_mem is specified, the default value becomes ordered.

The "optimize_mem" parameter optimizes memory bandwidth by automatically placing the SDRAM reference into either the Odd or Even queues. The Odd or Even queues are selected according to whether the address references data in the odd or even SDRAM bank. This may result in the references being executed in an order different from that in which they were issued. Not used with ordered or priority. If neither priority nor optimize_mem is specified, the default value becomes ordered.

The "indirect_ref" parameter indicates that overriding qualifiers or additional qualifiers are associated with this reference. These qualifiers are output by the ALU during the previous microword. The format of the qualifier depends on the SDRAM command. There are different formats for read/write, r_fifo_rd, and t_fifo_wr, as shown in the following figures.

FIG. 9 is a block diagram showing a format for an Indirect_refer READ/WRITE Command, where:

| Bits | Field | Description |
| --- | --- | --- |
| 31 | OV | If set, the UENG ADDR field overrides the default microengine address implied by the SDRAM command, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27 | OV | If set, the XADD field overrides the default transfer register address implied by the R_FIFO_RD instruction. |
| 26 | ABS | If set, enables absolute addressing for the microengine transfer registers. This bit should always be set if bit [27] (OV) is set. |
| 25:21 | XADD | Absolute transfer register address. Valid addresses are: 0–7 Eight transfer registers for context 0. 8–15 Eight transfer registers for context 1. 16–23 Eight transfer registers for context 2. 24–31 Eight transfer registers for context 3. |
| 20 | OV | if set, the REF CNT field overrides the ref_count specified by the SDRAM instruction. |
| 19:16 | REF CNT | The number of quadwords to be transferred to/from SDRAM. Valid REF CNT values are 0 through 3, where the number of quadwords = REF CNT + 1. 15 OV Only applies to SDRAM writes. If set, the BYTE MASK field overrides the default byte mask of 0xFF implied by the SDRAM instruction. BYTE MASK values other than 0xFF require REF CNT = 1. |
| 14:7 | BYTE MASK | BYTE MASK allows aligned byte write operations within an addressed SDRAM quadword. The bytes that are written are specified by the byte mask. For each bit in the byte mask, a value of 1 enable write to occur in the corresponding byte |

-continued

| Bits | Field | Description |
|---|---|---|
| | | position and a value of 0 preserves the previously existing value. The least significant bit corresponds to the right-most byte; the most significant bit corresponds to the left-most byte. A byte mask other than the default (0xFF) requires the SDRAM controller to perform a read-modify-write operation, which impacts performance. |
| 6:3 | RES | Reserved. Returns 0 when read. |
| 2 | OV | If set, the CTX field overrides the default context implied by the SDRAM instruction. |
| 1:0 | CTX | Specifies the context associated with the memory reference. If bit [2] = 0, this field is a don't care. Valid CTX values are 0 through 3. |

Referring to FIG. 10, a block diagram of a format for an Indirect_reference T_FIFO_WR command is shown, where:

| Bits | Field | Description |
|---|---|---|
| 31 | OV | If set, the UENG ADDR field overrides the default microengine address implied by the T_FIFO_WR instruction, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27:21 | RES | Reserved. Returns 0 when read. |
| 20 | OV | If set, the REF CNT field overrides the ref_count specified by the T_FIFO_WR instruction. |
| 19:16 | REF CNT | The number of quadwords to be transferred to be transferred to/from SDRAM. Valid REF CNT values are 0 through 15. |
| 15 | RES | Reserved. Returns 0 when read. |
| 14:12 | BYTE ALN | Indicates byte alignment when addressing the transmit FIFO. |
| 11:4 | XMIT FIFO | QWD ADDR Specifies the address of one of the 160 quadwords in the transmit FIFO. Lower numbered addresses are the first to be transmitted onto the FIFO bus. |
| 3 | RES | Reserved. Returns 0 when read. |
| 2 | OV | If set, the CTX field overrides the default context implied by the T_FIFO_WR instruction. |
| 1:0 | CTX | Specifies the context associated with the memory ref. If bit [2] = 0, this field is a don't care. Valid CTX values are 0 through 3. |

Referring to FIG. 11, a block diagram of a format for a read R_FIFO_Rd command is shown, where:

| Bits | Field | Description |
|---|---|---|
| 31 | OV | If set, the UENG ADDR field overrides the default microengine address implied by the SDRAM instruction, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27:21 | RES | Reserved. Returns 0 when read. |
| 20 | OV | If set, the REF CNT field overrides the ref_count specified by the T_FIFO_WR instruction. |

-continued

| Bits | Field | Description |
|---|---|---|
| 19:16 | REF CNT | The number of quadwords to be transferred to be transferred to/from SDRAM. Valid REF CNT values are 0 through 15. |
| 15:12 | RES | Reserved. Returns 0 when read. |
| 11:4 | | RECV FIFO QWD ADDR Specifies the address of one of the 160 quadwords in the receive FIFO. Lower numbered addresses are the first to be received from the FIFO bus. |
| 3 | RES | Reserved. Returns 0 when read. |
| 2 | OV | If set, the CTX field overrides the default context implied by the SDRAM instruction. |
| 1:0 | CTX | Specifies the context associated with the memory reference. If bit [2] = 0, this field is a don't care. Valid CTX values are 0 through 3. |

The computer instruction set also includes an instruction to issue a memory reference to scratchpad memory.

A format of the memory reference instruction to scratch memory is scratch[scratch_cmd, $sram_xfer_reg, source_op1, source_op2, ref_count _or_bit_op], optional_token. Each of the fields are fully described below.

The "Scratch_cmd" field represents an operation to be performed on scratchpad memory. A "bit_wr" operation sets or clears user specified bits in a scratchpad longword. A "read" operation reads from scratchpad to a SRAM transfer register. A "write" operation writes to scratchpad from an SRAM transfer register. A "incr" operation increments the addressed scratchpad location; ref_count must equal 1.

The "$sram_xfer_reg" field, if the read or write scratch_cmd parameters are used, represents a beginning of a contiguous set of registers which receive or supply the scratchpad data on a read or write operation, respectively. If the incr scratch_cmd parameter is used, this must be "—". SRAM transfer register names always begin with a $ symbol. If the "bit_wr scratch_cmd" parameter is used, this register contains a bit mask that chooses which bits should be set or cleared. For the test_and_set_bits and test_and_clear_bits options, this register also returns the original data as it existed before setting or clearing bits.

The "source_op1" and "source_op2" fields represent context-relative registers or 5-bit zero filled immediate data ranging from +31 to 0. These operands are added together to form the scratchpad address. Valid scratchpad addresses range from 0 to 1023.

The "ref_count_or_bit_op" field, if the read, write, or incr scratch_cmd parameters are used, specifies the number of contiguous scratchpad longwords to be referenced with this operation. If the count is >1, then the scratchpad address is implicitly incremented for each subsequent reference. Valid reference count values are 1 through 8 for read and write operations. If the incr scratch_cmd parameter is used, the reference count must be 1. If the bit_wr scratch_cmd parameter is used, one of the following parameters must also be used: "set_bits" are used to set or clear bits at an address using a specified bit mask. "clear_bits" are used to set or clear bits at an address using a specified bit mask. "test_and_set_bits" are also used to set or clear bits, but return the original data as it existed before the operation. "test_and_clear_bits" are also used to set or clear bits, but return the original data as it existed before the operation.

The "optional_token" field is a user selectable optional field containing one of the parameters described below.

The "sig_done" parameter indicates when the reference completes, signal the corresponding microengine/thread pair that is sourcing or sinking the memory data. Not used with ctx_swap.

The "ctx_swap" parameter indicates when the memory reference is issued, swap out the current thread execution to let another one run. Not used with sig_done.

The "defer [1]" parameter is used with the sig_done or ctx_swap options. Specifies that one instruction will be executed after this reference before the context is swapped. Not used with sig_done.

The "indirect_ref" parameter indicates that overriding qualifiers or additional qualifiers are associated with this reference. These qualifiers are output by the ALU during the previous microword. The format of the qualifier depends on the scratchpad command.

Referring to FIG. 12 a block diagram of a format for an indirect_ref for a READ/WRITE Command is shown, where

| Bits | Field | Description |
|---|---|---|
| 31 | OV | If set, the UENG ADDR field overrides the default microengine address implied by the SCRATCH instruction, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27 | OV | If set, the XADD field overrides the default transfer register address implied by the SCRATCH instruction. |
| 26 | ABS | If set, enables absolute addressing for the microengine transfer registers. This bit should always be set if bit [27] (OV) is set. |
| 25:21 | XADD | absolute transfer register aadress. Valid addresses are: 0–7 Eight transfer registers for context 0.8–15 Eight transfer registers for context 1.16–23 Eight transfer registers for context 2.24–31 Eight transfer registers for context 3. |
| 20 | OV | If set, the REF CNT field overrides the ref_count specified by the SCRATCH instruction. |
| 19:16 | REF CNT | The number of longwords to be transferred to/from scratchpad memory. Valid REF CNT values are 0 through 7, where the number of longwords = REF CNT + 1. |
| 15 | OV | If set, the BYTE MASK field overrides the default byte mask of 0xF implied by the SCRATCH instruction. |
| 14:11 | RES | Reserved. Returns 0 when read. |
| 10:7 | BYTE MASK | BYTE MASK allows aligned byte write operations within an addressed scratchpad longword. The bytes that are written are specified by the byte mask. For each bit in the byte mask, a value of 1 enables a write to occur in the corresponding byte position and a value of 0 preserves the previously existing value. The least significant bit corresponds to the right-most byte; the most significant bit corresponds to the left-most byte. A byte mask other than the default (0xF) requires a read-modify-write operation, which impacts performance. |
| 6:3 | RES | Reserved. Returns 0 when read. |
| 2 | OV | If set, the CTX field overrides the default context implied by the SCRATCH instruction. |
| 1:0 | CTX | Specifies the context associated with the memory reference. If bit [2] = 0, this field is a don't care. Valid CTX values are 0 through 3. |

Referring to FIG. 13, a block diagram of a format for an Indirect_ref BIT_WR Command is shown, where

| Bits | Field | Description |
|---|---|---|
| 31 | OV | If set, the UENG ADDR field overrides the default microengine address implied by the scratch instruction, which is the microengine that issued the reference. |
| 30:28 | UENG ADDR | Specifies the microengine associated with the memory reference. If bit [31] = 0, this field is a don't care. Valid UENG ADDR values are 0 through 5. |
| 27 | OV | If set, the XADD field overrides the default transfer register address implied by the SCRATCH instruction. |
| 26 | ABS | If set, enables absolute addressing for the microengine transfer registers. This bit should always be set if bit [27] (OV) is set. |
| 25:21 | XADD | Absolute transfer register address. Valid addresses are: 0–7 Eight transfer registers for context 0. 8–15 Eight transfer registers for context 1. 16–23 Eight transfer registers for context 2. 24–31 Eight transfer registers for context 3. |
| 20 | OV | If set, the TS and ST fields override the bit operation specified by the SCRATCH instruction. |
| 19:18 | RES | Reserved. Returns 0 when read. |
| 17 | TS | When set, specifies that the read data is returned before the write operation so that the data can be tested. |
| 16 | ST | Specifies whether the operation is set (ST = 1) or clear(ST = 0). |
| 15:3 | RES | Reserved. Returns 0 when read. |
| 2 | OV | If set, the CTX field overrides the default context implied by the scratch instruction. |
| 1:0 | CTX | Specifies the context associated with the memory reference. If bit [2] = 0, this field is a don't care. Valid CTX values are 0 through 3. |

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An execution unit for executing multiple context threads comprises:

an arithmetic logic unit to process data for executing threads;

control logic to control the operation of the arithmetic logic unit;

context event switching logic including signal inputs from a plurality of shared resources with the signal inputs causing the context event logic to indicate that threads are either available or unavailable for execution;

a set of memory location for storing a list of available threads that are ready to be executed;

a set of memory locations for storing a list of unavailable threads that are not ready to be executed;

general purpose register set to store and obtain operands for the arithmetic logic unit;

a read transfer register for inputting data to the execution unit, the read transfer register accessible to at least one of the plurality of shared resources;

a write transfer register for outputting data from the execution unit, the write transfer register accessible to at least one of the plurality of shared resources;

wherein the read and write transfer register sets are divided into a plurality of banks and a plurality of relatively addressable windows that correspond to individual threads to execute in the processor and where execution of a read or write instruction to a memory location causes a corresponding read or write to a location in the transfer registers.

2. The execution unit of claim 1 wherein the read or write instruction specifies an optional token.

3. The execution unit of claim 2 wherein the optional token specifies ctx_swap and causes the currently running thread to be swapped out to the unavailable thread memory set and a thread from the available thread memory set to begin execution.

4. The execution unit of claim 2 wherein the optional token specifies defer_one and causes execution of one more instruction and then causes the current context to be swapped out.

5. The execution unit of claim 2 wherein the read instruction optional token specifies one of the signal inputs and causes a currently running thread to be swapped out to the unavailable thread memory set, and upon receipt of the specified signal input causes the swapped out thread to be stored in the available thread memory set and indicates the requested data is available in the transfer register.

6. The execution unit of claim 2 wherein the write instruction optional token specifies one of the signal inputs and causes a currently running thread to be swapped out to the unavailable thread memory set and upon receipt of the specified signal input causes the swapped out thread to be stored in the available thread memory set and indicates the specified data has been sent out to memory.

7. A processor unit comprises:

an execution unit for executing multiple context threads comprising:

an arithmetic logic unit to process data for executing threads;

control logic to control the operation of the arithmetic logic unit;

context event switching logic including signal inputs from a plurality of shared resources with the signal inputs causing the context event logic to indicate that threads are either available or unavailable for execution;

a set of memory locations for storing a list of available threads that are ready to be executed;

a set of memory locations for storing a list of unavailable threads that are not ready to be executed;

general purpose register set to store and obtain operands for the arithmetic logic unit;

a read transfer register for inputting data to the execution unit, the read transfer register accessible to at least one of the plurality of shared resources; and a write transfer register for outputting data from the execution unit, the write transfer register accessible to at least one of the plurality of shared resources.

8. The processor of claim 7 wherein the read and write transfer register sets are divided into a plurality of banks and a plurality of relatively addressable windows that correspond to individual threads to execute in the processor and where execution of a read or write instruction to a memory location causes a corresponding read or write to a location in the transfer registers.

9. The processor of claim 8 wherein the read or write instruction specifies an optional token.

10. The processor of claim 9 wherein the optional token specifies ctx_swap and causes the currently running thread to be swapped out to the unavailable thread memory set and a thread from the available thread memory set to begin execution.

11. The processor of claim 9 wherein the optional token specifies defer_one and causes execution of one more instruction and then causes the current context to be swapped out.

12. The processor of claim 9 wherein the read instruction optional token specifies one of the signal inputs and causes a currently running thread to be swapped out to the unavailable thread memory set, and upon receipt of the specified signal input causes the swapped out thread to be stored in the available thread memory set and indicates the requested data is available in the transfer register.

13. The processor of claim 9 wherein the write instruction optional token specifies one of the signal inputs and causes a currently running thread to be swapped out to the unavailable thread memory set and upon receipt of the specified signal input causes the swapped out thread to be stored in the available thread memory set and indicates the specified data has been sent out to memory.

14. A method for executing multiple context threads comprises:

processing data for executing thread within an arithmetic logic;

operating control logic to control the arithmetic logic;

operating context event switching logic with the context event logic constructed with signal inputs from a plurality of shared resources and with the signal inputs causing the context event logic to indicate that threads are either available or unavailable for execution;

storing and obtaining operands for the arithmetic logic unit within a general purpose register set;

inputting data from memory through a read transfer register;

outputting data to memory through a write transfer register;

accessing data from at least one of the read transfer register and the write transfer register by at least one of the plurality of shared resources; and arranging the read and write transfer register sets into a plurality of banks and a plurality of relatively addressable windows that correspond to individual threads which may be executed in the processor.

15. The method of claim 14 wherein reading or writing to memory causes a corresponding reading or writing to a location in the transfer registers.

16. The method of claim 15 wherein reading or writing to memory includes specifying an optional token.

17. The method of claim 16 wherein specifying the optional token as ctx_swap causes the currently running thread to be swapped out.

18. The method of claim 15 wherein specifying the optional token as one of the signal inputs causes the context event logic to swap out the currently executing thread and upon receipt of the specified signal input causes the context event logic to indicate that the swapped out thread is available for execution.

19. An article comprising a machine-readable medium having stored thereon machine-executable instructions that when executed by a machine causes the machine to:

process data for executing thread within an arithmetic logic;

operate control logic to control the arithmetic logic;

operate context event switching logic with the context event logic constructed with signal inputs from a plurality of shared resources and with the signal inputs causing the context event logic to indicate that threads are either available or unavailable for execution;

store and obtain operands for the arithmetic logic unit within a general purpose register set;

input data from memory through a read transfer register;

output data to memory through a write transfer register;

access data from at least one of the read transfer register and the write transfer register by at least one of the plurality of shared resources; and arrange the read and write transfer register sets into a plurality of banks and a plurality of relatively addressable windows that correspond to individual threads which may be executed in the processor.

20. The article of claim 19 further comprising a machine-readable medium having stored thereon machine-executable instructions that when executed by a machine causes the machine to:

read or write to memory and cause a corresponding read or write to a location in the transfer registers.

21. The article of claim 20 further comprising a machine-readable medium having stored thereon machine-executable instructions that when executed by a machine causes the machine to:

specify an optional token when reading or writing to memory.

22. The article of claim 21 further comprising a machine-readable medium having stored thereon machine-executable instructions that when executed by a machine causes the machine to:

specify the optional token as ctx swap; and swap out the currently running thread.

23. The article of claim 20 further comprising a machine-readable medium having stored thereon machine-executable instructions that when executed by a machine causes the machine to:

specify the optional token as one of the signal inputs; and swap out the currently executing thread; and upon receipt of the specified signal input indicate that the swapped out thread is available for execution.

* * * * *